3,496,243
PRODUCTION OF DICHLOROETHANE AND
TRICHLOROETHANE
Sidney Berkowitz, Highland Park, and Albert R. Morgan, Jr., Princeton, N.J., assignors to FMC Corporation, New York, N.Y., a corporation of Delaware
No Drawing. Filed Sept. 14, 1965, Ser. No. 487,299
Int. Cl. C07c 17/02
U.S. Cl. 260—662　　　　　　　　　　　　　4 Claims

ABSTRACT OF THE DISCLOSURE

A method for the production of dichloroethane and trichloroethane in high yields and in a short reaction time which comprises contacting chlorine and ethylene vapors at an elevated temperature and at a specified molar ratio of chlorine to ethylene, for at least 0.1 second in a particulate catalyst-diluent bed which is sodium chloride, potassium chloride or mixtures thereof.

---

This invention relates to the production of dichloroethane and trichloroethane, and particularly to an efficient and short-time vapor-phase process for producing these materials from ethylene and chlorine.

Dichloroethane and trichloroethane are useful products in themselves, and are especially desired as precursors to the production of trichloroethylene and perchloroethylene by oxychlorination. The di- and tri-chloroethanes have been produced heretofore most often in liquid phase reactions, which result in the production of a reaction mixture which must be distilled to yield the desired products. Such reaction mixtures often have contained low temperature boiling side products which must be removed before the reaction product can be used or fed as a precursor to a trichloroethylene and perchloroethylene process.

It therefore has remained desirible to provide a fast and efficient method of producing dichloroethane and trichloroethane from ethylene by a process which utilizes essentially all of the ethylene and chlorine fed, and which produces a reaction mixture high in the desired products and containing as by-products only high temperature boiling chlorinated materials which are not detrimental either in normal use of the dichloroethane and trichloroethane or in oxychlorination reactions to which they may be fed.

We now have found that we can produce dichloroethane and trichloroethane from ethylene by reaction of chlorine and ethylene in a reaction which utilizes essentially all of the chlorine and ethylene fed and produces a product consisting mostly of the desired products, by contacting the chlorine and ethylene in vapor phase at a temperature of about 80° to 350° C., and preferably 200° to 220° C., employing a molar ratio of about 1.1 to 2 moles of chlorine per mole of ethylene, and preferably about 1.2 to 1.6 moles of chlorine per mole of ethylene, for at least about 0.1 second in a catalyst and diluent bed formed of sodium chloride, potassium chloride or mixtures of sodium chloride and potassium chloride, the bed being composed of particles having a size of about 2 to 100 U.S. standard mesh, and preferably about 4 to 16 U.S. standard mesh. Preferably the reaction is run in the presence of an inert diluent gas or vapor, for example hydrogen chloride, nitrogen, carbon tetrachloride, perchloroethylene or other gas or vapor inert to the reaction. When it is used, the diluent is employed in an amount up to about 50% by weight of the total weight of the reaction gases.

Quite surprisingly, this manner of operating in the presence of our particular catalyst diluent (the chloride) provides essentially complete utilization of the chlorine and ethylene, and produces a product containing essentially no low-boiling side products such as vinyl chloride, vinylidene chloride and the like which often results from other methods of reacting chlorine and ethylene. Furthermore, the excellent control over the reaction provided by the catalyst diluent avoids creation of hot-spots which lead to over-oxidation of the ethylene.

The reaction sometimes produces small amounts, up to on the order of 5–15%, of high boilers such as tetrachloroethane and pentachloroethane. This is not detrimental, however, particularly when the reaction product is used as a feed to an oxychlorination reaction for production of perchloroethylene and trichloroethylene, since these high-boilers are cracked during the oxychlorination reaction to yield products useful as precursors to the desired perchloro and trichloroethylene. These results are not achieved with beds of other solids, for example silicon carbide, porcelain saddles, glass beads or the like. When these other materials are used, as is shown hereinafter in the comparative examples, either the reactants do not react completely or violent and uncontrollable reactions occur.

The catalyst bed, which also serves as a solid reaction diluent, is a bed of sodium chloride, potassium chloride or a mixture of sodium chloride and potassium chloride, particles having a particle size on the order of 2 to 100 U.S. standard mesh, and preferably 4 to 16 U.S. standard mesh. Particles smaller than 100 mesh tend to blow out of the reactor, and are wasted, whereas larger particles are difficult to obtain and in any event have a low surface area available for contact with the reaction gases, relative to the particles employed by us.

One particularly useful material for the catalyst bed is rock salt, one form of which may be obtained as the naturally occurring mineral Halite, available at any desired particle size, and essentially pure rock salt. Another useful material is Sylvinite, which is a naturally occurring mineral composed of roughly 50 parts of sodium chloride to 50 parts of potassium chloride on a molar basis. This proportion of sodium chloride and potassium chloride in Sylvinite is variable and depends on the source of the material; it may range to as far as 60% of either the sodium or potassium chloride. Yet another naturally occurring material of utility in our process is Sylvite, a mineral composed mainly, e.g. 99%, of potassium chloride. Small amounts, from up to about 50% of total bed weight of solids inert or catalytic to the reaction may be provided in the bed, provided they do not either speed the reaction too much if catalytic, or make necessary an uneconomically large bed, if they are inert. However, we prefer to employ beds composed essentially entirely of the herein chlorides.

The bed is provided in a depth which allows for the required residence time of at least 0.1 second, and preferably not more than about 10 seconds. The upper limit on the contact time is set only for economic reasons, it being possible to permit the gaseous reactants and reaction products to remain in contact with the bed for longer times. It is necessary only that the contact be for a sufficient time to permit complete reaction to occur. Preferably the bed is 5 to 50 inches in depth.

The bed preferably is a fixed bed of catalyst and diluent particles, although it is possible to fluidize the catalyst and diluent if it is in a proper fluidizable size, namely 30 to 100 mesh.

Any suitable apparatus can be used for the catalyst and diluent bed, it only being necessary to provide for feed of the chlorine and ethylene reactants, and any gaseous or vaporous diluent which may be used, through the bed. Product gases are recovered and either used as such, or distilled to separate them if desired.

The flow rate of the reactants through the bed is not critical, so long as it is suffcient, coupled with the depth of the catalyst and diluent bed and the particles size of the catalyst-diluent to provide the herein residence time of 0.1 to about 10 seconds. Deeper beds permit faster flow, and vice-versa. Generally the mass flow rate should be about 5 to 500 cc./sec. cm$^2$.

The reaction of chlorine and ethylene can be carried out suitably at about 80° to 350° C. although we prefer to operate at about 200° to 220° C. Operations substantially below 80° C. result in a slow, incomplete reaction, whereas it is difficult to control reactions carried out much above 350° C.

The reactants in this process are chlorine and ethylene. They are used in a molar ratio of about 1.1 to 2 moles of chlorine per mole of ethylene, and preferably 1.2 to 1.6 moles of chlorine per mole of ethylene. If more than about 2 moles of chlorine per mole of ethylene are employed the reaction is too vigorous and hard to control. If less than 1.1 moles of chlorine is used per mole of ethylene, incomplete utilization of the ethylene occurs.

A diluent gas may be used together with the chlorine and ethylene reactants. The diluent may be used in amounts from 0 up to about 50% by weight of the total gaseous or vapor feed. In cases where a low chlorine to ethylene ratio within the herein range is employed, approaching 1.1 moles of chlorine per mole of ethylene, the diluent is not really necessary, since the reaction does not take place vigorously. When the ratio of chlorine to ethylene is near the upper end of our range, namely on the order of 1.7 to 2 moles of chlorine per mole of ethylene, it is desirable to employ a diluent in order to slow and control the reaction.

Any gas or vapor which is inert to the reaction is used as a diluent. Suitable diluents include hydrogen chloride, nitrogen, perchloroethylene and carbon tetrachloride.

The product of the reaction contains as much as an equimolar amount of trichloroethane relative to dichloroethane when the reaction is run with a molar ratio of chlorine to ethylene approaching 2 to 1. When proportionately less chlorine is used, for example at the lower end of our range (represented by 1.1 moles of chlorine per mole of ethylene) as much as 90% of the reaction product is dichloroethane. Separation of these products, and of byproducts, when desired is carried out by conventional means, for example by vacuum fractionation, preferential absorption and the like.

The following examples are presented by way of illustration of this invention only, and are not to be considered as limiting the scope thereof in any way.

EXAMPLE 1

A 25 mm. I.D. glass tube having a 10 mm. thermowell was packed with rock salt (Halite sodium chloride having a particle size of 4 to 8 mesh) for a depth of 22 inches. The tube was heated in an electrical furnace to 200° C., and a gas stream containing 42.5 mmoles/min. of ethylene, 60 mmoles/min. of chlorine and 16 mmoles/min. of hydrogen chloride was fed into the reactor. The exit gas stream passed through a series of traps cooled to −78° C. The contact time in the bed was about 3 seconds. Product was collected and weighed after 30 minutes of running. The collected product analyzed as follows:

| Product: | mmoles/min. |
|---|---|
| 1,2 - dichloroethane | 21.5 |
| 1,1,2 - trichloroethane | 17.6 |
| 1,1,2,2 - tetrachloroethane | 1.45 |
| Pentacloroethane | 1.23 |
| Chlorine and carbon balances were | ≈100% |

This represented utilization of 98.5% of the ethylene, and essentially all of the chlorine, fed.

EXAMPLE 2

The same reactor and reaction conditions as used in Example 1 were employed, with the exception that the incoming feed was 42.5 mmoles/min. of ethylene, 52.2 mmoles/min. of chlorine, and 24 mmoles/min. of hydrogen chloride. The product stream was collected after 30 minutes of running and analyzed with the following results:

| Product: | mmoles/min. |
|---|---|
| 1,2 - dichloroethane | 37.7 |
| 1,1,2 - trichloroethane | 7.6 |
| 1,1,2,2 - tetrachloroethane | 0.31 |
| Pentachloroethane | 0.53 |

The chlorine and carbon balances were ≈100%, indicating essentially complete utilization of chlorine and ethylene.

EXAMPLE 3

This reaction illustrates the effect of temperature on product distribution. The same reactor and reaction conditions were employed as in Example 1, except that the reaction temperature was 150° C. The following results were obtained:

| Product: | Mmoles/min. |
|---|---|
| 1,2-dichloroethane | 37.7 |
| 1,1,2-trichloroethane | 6.20 |
| Sym. 1,1,2,2 - tetrachloroethane pentachloroethane | 0.22 |

Again chlorine and ethylene utilization was essentially 100%.

EXAMPLE 4

A 25 mm. I.D. glass tube with a 10 mm. thermowell was packed to a depth of 22 inches with Sylvinite (50% Sylvite, 50% Halite, mesh size 4 to 8). The tube was heated in an electric furnace to 325° C. A gas stream of 21.25 mmoles/min. of ethylene, 30 mmoles/min. of chlorine and 15 mmoles/min. of HCl was fed into the reactor with a contact time of 7 seconds. The exit gas stream was passed through a series of traps cooled to −78° C. and after 30 min. the product was collected, weighed and analyzed. The following results were obtained:

| Product: | Mmoles/min. |
|---|---|
| Vinyl chloride | trace |
| 1,2-dichloroethane | 12.6 |
| 1,1,2-trichloroethane | 8.4 |
| 1,1,2,2-tetrachloroethane | 0.25 |

The chlorine and carbon balances were ≈100%, indicating about 100% yields.

EXAMPLE 5

The same reactor and reaction conditions as employed in Example 4 were employed except that the bed was packed with Sylvite (KCl 98.5%, NaCl 1.3%, mesh size 4–8). The following results were obtained:

| Product: | Mmoles/min. |
|---|---|
| 1,2-dichloroethane | 13.6 |
| 1,1,2-trichloroethane | 6.8 |
| 1,1,2,2-tetrachloroethane | 0.8 |

The carbon balance was ≈99.0%, and the chlorine balance ≈99.5%.

EXAMPLE A
Comparative

This example was run to demonstrate the results obtained when other catalyst diluent beds are used. In this case calcium chloride at a particle size of 4 to 8 mesh, was substituted for the catalyst diluent bed of Example 4, under the same conditions as employed in Example 4. The product of this reaction analyzed as follows:

| Product: | Mmoles/min. |
|---|---|
| Vinyl chloride | 6.8 |
| Vinylidene chloride | 4.3 |
| Cis and trans-dichloroethylene | 1.4 |
| 1,2-dichloroethane | trace |
| 1,1,2-trichloroethane | 0.1 |
| Tetrachloroethanes | 0.5 |
| Unknown high-boilers | 8.15 |

Extensive charring and coking took place in the bed. Tar formation occurred throughout the system, with polymer formation taking place in the product take-off tube.

EXAMPLE B
Comparative

In this example, the efficiency of the sodium chloride catalyst used in Example 1 above is compared with the efficiency of other typical bed materials. The material referred to under (a), (b) and (c) below were employed under the same conditions as sodium chloride was employed in Example 1. The results are summarized as follows:

| Catalyst | Results |
|---|---|
| (a) Silicon carbide, mesh 4–8 | Violent, uncontrollable exotherm, extensive charring. No collection possible |
| (b) Intalox saddles (ceramic), mesh=4–8 | 1,2-dichlorethane — 23.3 mmoles/min.<br>1,1,2-trichloroethane — 4.9<br>trans-1,2-dichlorethylene — 0.1<br>Unknowns=16.3% of total product, 21.5% of $Cl_2$ introduced was recovered unreacted. |
| (c) Glass beads, mesh=4–8 | Hot spot developed in bed, with noticeable charring near top of bed. Carbon balance=80%.<br>1,2-dichlorethane — 19.1 mmoles/min.<br>1,1,2-trichloroethane — 13.5<br>1,1,2,2-tetrachlorethane — 1.6<br>Pentachloroethane — 2.2 |
| (d) Halite (sodium chloride), mesh=4–8 (catalyst diluent of our invention) | 1,2-dichloroethane — 21.5 mmoles/min.<br>1,1,2-trichloroethane — 17.6<br>1,1,2,2-tetrachloroethane — 1.45<br>Pentachloroethane — 1.23<br>Chlorine and carbon balances were ≈100%. This represented utilization of 98.5% of the ethylene, and essentially all of the chlorine, fed. |

The above examples demonstrate the extreme efficiency of the vapor phase reaction of chlorine and ethylene in the presence of our sodium chloride, potassium chloride or mixed sodium chloride and potassium chloride, catalyst and diluent. The comparative examples demonstrate that the same techniques employed with other bed materials do not provide anywhere near the controlled, highly efficient reaction provided with our catalyst.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

1. A method of producing both dichloroethane and trichloroethane in high yields and in a short time reaction, comprising contacting reactant vapors consisting essentially of ethylene and chlorine at a temperature of 80° to 350° C. and in a molar ratio of chlorine to ethylene of 1:1 to 2:1 for at least 0.1 second in a bed of 2 to 100 mesh particles of sodium chloride, potassium chloride or mixtures of said sodium chloride and potassium chloride, in the presence of hydrogen chloride as a diluent gas and recovering the gaseous reaction products containing said dichloroethane and trichloroethane.

2. The method of claim 1 in which the bed is sodium chloride.

3. The method of claim 1 in which the bed is potassium chloride.

4. The method of claim 1 in which the diluent bed is a mixture of sodium chloride and potassium chloride.

References Cited
UNITED STATES PATENTS

| | | | |
|---|---|---|---|
| 2,099,231 | 11/1937 | Ruys et al. | 260—662 |
| 2,520,712 | 8/1950 | Cheney. | |
| 3,215,508 | 11/1965 | Piester. | |

FOREIGN PATENTS 562,010   8/1958   Canada.

LEON ZITVER, Primary Examiner

J. BOSKA, Assistant Examiner

UNITED STATES PATENT OFFICE
CERTIFICATE OF CORRECTION

Patent No. 3,496,243         Dated February 17, 1970

Inventor(s) Sidney Berkowitz and Albert R. Morgan, Jr.

It is certified that error appears in the above-identified patent and that said Letters Patent are hereby corrected as shown below:

Column 5, Example B, Comparative under Results (b) "1,2-dichlorethane" should read --1,2-dichloroethane-- and "trans-1,2-dichlorethylene" should read --trans-1,2-dichloroethylene--.

and under Results (c)

"1,2-dichlorethane" should read --1,2-dichloroethane-- and "1,1,2-trichlorethane" should read --1,1,2-trichloroethane-- and "1,1,2,2-tetrachlorethane" should read --1,1,2,2-tetrachloroethane--.

Column 6, line 12, "1:1 should read --1.1--.

Column 6, line 22, "the diluent bed" should read --the bed--.

Signed and sealed this 4th day of May 1971.

(SEAL)
Attest:

EDWARD M. FLETCHER, JR.          WILLIAM E. SCHUYLER, JR.
Attesting Officer                Commissioner of Patents